United States Patent
Merino Vazquez et al.

(10) Patent No.: US 9,026,675 B2
(45) Date of Patent: May 5, 2015

(54) IMS RESTORATION PROCEDURES FOR MULTIPLE CONTACTS

(75) Inventors: Emiliano Merino Vazquez, Madrid (SE); Hubert Przybysz, Hagersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 609 days.

(21) Appl. No.: 13/127,171

(22) PCT Filed: Oct. 31, 2008

(86) PCT No.: PCT/EP2008/064842
§ 371 (c)(1),
(2), (4) Date: May 2, 2011

(87) PCT Pub. No.: WO2010/049009
PCT Pub. Date: May 6, 2010

(65) Prior Publication Data
US 2011/0213896 A1   Sep. 1, 2011

(51) Int. Cl.
*G06F 15/16* (2006.01)
*H04L 29/06* (2006.01)
(Continued)

(52) U.S. Cl.
CPC ...... *H04L 65/1016* (2013.01); *H04L 29/12188* (2013.01); *H04L 61/1588* (2013.01); *H04L 61/3095* (2013.01); *H04L 65/1006* (2013.01); *H04L 65/1073* (2013.01); *H04L 69/40* (2013.01)

(58) Field of Classification Search
CPC ............................ G15F 15/16; H04L 29/12188
USPC .......................................................... 709/245
See application file for complete search history.

(56) References Cited

U.S. PATENT DOCUMENTS 7,936,665 B2 *  5/2011  Ishii ................................ 370/216
8,134,956 B2 *  3/2012  Siegel et al. ................... 370/328
(Continued)

FOREIGN PATENT DOCUMENTS

EP          1916821 A1     4/2008
WO    WO 02/054686 A2     7/2002
(Continued)

OTHER PUBLICATIONS

3GPP TS 29.228 V7.5.0 (Mar. 2007)—Technical Specification 3rd Generation Partnership Project—Signalling flows and message contents—Release 7.*

(Continued)

*Primary Examiner* — Guang Li
(74) *Attorney, Agent, or Firm* — Roger S. Burleigh

(57) ABSTRACT

In one aspect, the invention provides a method, and associated apparatus for re-registering a contact address of a user of an IP Multimedia Subsystem, IMS, network. A request for re-registration of the contact address is received at a Serving-Call Session Control Function, S-CSCF, node serving the user. After a determination that the S-CSCF has no stored information relating to the contact address, a request is sent to a Home Subscriber Server, HSS, of the user to register the contact address information. The HSS detects if the contact address information relating to the user has already been backed-up by the HSS, and notifies the node serving the user of registered contact address information backed-up by the HSS. Another aspect provides a method and associated apparatus for de-registering a registered contact address of a user of an IP Multimedia Subsystem, IMS, network.

9 Claims, 9 Drawing Sheets

(51) Int. Cl.
*H04L 29/12* (2006.01)
*H04L 29/14* (2006.01)

(56) References Cited

U.S. PATENT DOCUMENTS

| | | | |
|---|---|---|---|
| 8,422,488 B2* | 4/2013 | Belinchon Vergara et al. | 370/352 |
| 8,655,357 B1* | 2/2014 | Gazzard et al. | 455/435.1 |
| 2002/0128008 A1* | 9/2002 | Phan-Anh et al. | 455/424 |
| 2005/0136926 A1 | 6/2005 | Tammi et al. | |
| 2006/0291486 A1* | 12/2006 | Cai et al. | 370/401 |
| 2007/0113086 A1* | 5/2007 | Huang et al. | 713/168 |
| 2009/0191870 A1* | 7/2009 | Siegel et al. | 455/435.1 |
| 2009/0210743 A1* | 8/2009 | Gu et al. | 714/15 |
| 2010/0293261 A1* | 11/2010 | Belinchon Vergara et al. | 709/223 |
| 2010/0293593 A1* | 11/2010 | Lindholm et al. | 726/1 |
| 2010/0306397 A1* | 12/2010 | Belinchon Vergara et al. | 709/230 |
| 2012/0044802 A1 | 2/2012 | Gu et al. | |

FOREIGN PATENT DOCUMENTS

| | | |
|---|---|---|
| WO | WO 2005/064978 A1 | 7/2005 |
| WO | WO 2008052464 A1 * | 5/2008 |
| WO | WO 2009/006942 A1 | 1/2009 |

OTHER PUBLICATIONS

3GPP TS 23.380 V8.0.0 (Sep. 2008)—Technical Specification Group Core Network and Terminals—IMS Restoration Procedures—Release 8.*

3GPP. 3rd Generation Partnership Project; Technical Specification Group Core Network and Terminals; IP multimedia call control protocol based on Session Initiation Protocol (SIP) and Session Description Protocol (SDP); Stage 3 (Release 7). 3GPP TS 24.229 v7.4.0 (Jun. 2006).

Rosenberg, J. et al. SIP: Session Initiation Protocol. IETF RFC 326. Jun. 2002.

* cited by examiner

IMS RESTORATION PROCEDURES FOR MULTIPLE CONTACTS

TECHNICAL FIELD

The present invention relates to procedures for restoration of contacts after a re-start in an IP Multimedia Subsystem.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session, giving rise to a new generation of personalised, rich multimedia communication services.

FIG. 1 illustrates schematically how the IMS 2 fits into the mobile network architecture in the case of a GPRS/PS access network. The IMS 2 includes a core network 2a and a service network 2b. Call/Session Control Functions (CSCFs) 4 operate as SIP proxies within the IMS 2. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. In addition the IMS network includes a Home Subscriber Server (HSS) 6. The HSS 6 is the master user database that supports the IMS network entities. It contains subscription-related information and credentials for further authentication and authorisation of users.

A user registers with the IMS using the specified Session Initiation Protocol (SIP) REGISTER method. This is a mechanism for attaching to the IMS and announcing to the IMS the address at which a SIP user identity can be reached. The user receives a unique URI (Uniform Resource Indicator) from the S-CSCF for it to use when it initiates a dialog. In 3GPP, when a SIP terminal performs a registration, the IMS authenticates the user, and allocates an S-CSCF to that user from the set of available S-CSCFs. When a registered user subsequently sends a session request (e.g. SIP INVITE) to the IMS, the request will include the P-CSCF and S-CSCF URIs so that the P-CSCF is able to forward the request to the selected S-CSCF. The registration information is stored by the HSS for a duration, which may be a set time before the end of which the user must re-register or until the user de-registers.

As specified in the 3GPP Technical Specification TS24.229 a user terminal (UE) can register a contact address for any IP address that it has acquired. This is particularly useful when the UE registers with the IMS over different access networks from which it acquires different IP addresses. As a result, the S-CSCF will have multiple contact addresses registered for the UE, each including the combination of the UE's IMS Private User Identity (IMPI) and IMS Public User Identity (IMPU). In addition a UE can register multiple contact addresses by including several contact address headers with different contact header parameters (but keeping the same IP address and port). For example, the different header parameters may be different feature tags. Multiple contact addresses can also arise as a result of the S-CSCF generating permanent and temporary Globally Routable User Agent URIs (GRUUs). As a result of the above there are many situations where an S-CSCF will have registered more than one contact address for the IMPI/IMPU combination of a UE.

The present invention is concerned with resolving problems that can arise following a failure of a S-CSCF node, and the subsequent restoration of IMS services. Currently 3GPP is standardising the procedures for restoration of IMS services and TS 23.380 has been written for this purpose, with the intention of resolving registration state inconsistencies in the network and restoring the service for the end user after failure of the S-CSCF node. However, there are currently problems that can arise where multiple contacts are registered for a UE, and these are discussed in more detail below. These problems will be better understood by first considering how a UE successfully registers multiple contact addresses.

FIG. 2 illustrates the signal flows between network entities, for a UE 20 successfully registering an initial contact address, Contact1, for the combination $IMPI_1/IMPU_1$. The network entities include, a P-CSCF 22, an I-CSCF 24, the user's HSS 28 and a S-CSCF 26. To start with the S-CSCF has no record of any contact addresses registered for the $IMPI_1/IMPU_1$ combination, a situation that could arise before the user has requested any contact address registrations, or if the S-CSCF 26 has lost registration data (e.g. following a restart after a failure).

At step 201 the UE 20 initiates the registration of a contact address (Contact1) by sending a registration request to the IMS network via the P-CSCF 22. This is forwarded at step 202 to the I-CSCF 24. At step 203 the I-CSCF 24 sends a User Authorisation Request (UAR) to the HSS 28, which contains an indication that "REGISTRATION" is requested for the $IMPI_1/IMPU_1$ combination. At step 204 (assuming that the user is authorised) the HSS 28 returns a User Authorisation Answer (UAA) to the I-CSCF 24 with the indication that this is a "FIRST_REGISTRATION" and defining the capabilities required of the S-CSCF that will be assigned for this purpose. The I-CSCF assigns (not shown) $S\text{-}CSCF_1$ having the required capabilities. At step 205, the I-CSCF 24 forwards the registration request to the $S\text{-}CSCF_1$ 26.

At step 206 the $S\text{-}CSCF_1$ 26 sends a Server Assignment Request (SAR) message to the HSS 28 with the indication "REGISTRATION" together with the Contact1 address information that the $S\text{-}CSCF_1$ 26 uses. At step 207 the HSS stores the information provided by the $S\text{-}CSCF_1$ 26 for the purpose of backing up this information in case this is required for subsequent restoration. At step 208 the HSS 28 returns a Server Assignment Answer (SAA) to indicate that the process has been successfully completed (DIAMETER_SUCCESS). This also includes the data that has been backed-up, and ensures that the $S\text{-}CSCF_1$ 26 now has all the information it requires, including the user profile and the IMPIs registered with $IMPU_1$. Steps 209 to 211 are 200 OK messages past back through the network to the UE 20 to indicate that the registration of contact1 has been successfully completed.

FIG. 3 illustrates the signal flows between the network entities for the UE 20 successfully registering a second contact address, Contact2, for the combination $IMPI_1/IMPU_1$, which has already been registered with Contact1.

As shown in FIG. 3, at step 301 the UE 20 initiates registration the Contact2 address. The process proceeds through steps 302 to 305 in the same way as steps 202 to 205 described above in FIG. 2 for the registration of Contact1. At step 306, the $S\text{-}CSCF_1$ 26 sends a SAR to the HSS 28, but this is a re-registration message, and includes the details of all the S-CSCF information to be backed up by the HSS, and including both the already existing contact address information for Contact1, as well as the new contact address information for Contact2. At step 307, although the HSS 28 already has S-CSCF restoration information backed up for the IMPI$_1$/IMPU$_1$ combination with Contact1, because the SAR indicates a re-registration this information is overwritten by the HSS 28 with the updated information in the SAR. Once this information has been backed up by the HSS 28 it returns a SAA to the S-CSCF$_1$ 26 at step 308, and the process is completed through steps 308 to 311 as described above for the registration of Contact1 in FIG. 2 steps 208-211.

FIG. 4 illustrates a problem that can arise with the current procedures in the event of a failure or re-start of the S-CSCF. As shown in FIG. 4 at step 400 a failure (crash) has occurred to the S-CSCF$_1$ 26 such that all the user information has been cleared. The failure has been restored, either by re-starting S-CSCF$_1$ 26 or by the I-CSCF 24 assigning another S-CSCF. However, the S-CSCF 26 has no data relating to registration of the Contact1 or Contact 2 addresses. Although this data was backed up by the user's HSS 28, the S-CSCF 26 has no way of knowing which users were previously registered, or to which networks they subscribed, so it cannot yet obtain the restoration data from the HSS 28.

At step 401 the UE 20 attempts to refresh the registration of Contact1. This may occur, for example, because the UE knows that the registration of Contact1 is about to be timed out and that it is necessary to refresh the registration. At step 402 the request is forwarded from the P-CSCF 22 to the I-CSCF 24 and at step 403 the UAR is sent to the HSS 28, as described above. At step 404 the HSS 28 returns a UAA, as before, to provide to the I-CSCF 24 the requirements of the S-CSCF 26. As in the initial registration shown in FIG. 2, the I-CSCF 24 assigns an S-CSCF 26 (which could be S-CSCF$_1$ or another S-CSCF that has been newly selected to replace S-CSCF$_1$). At step 405 the I-CSCF 24 forwards the registration request information to the appropriate S-CSCF 26. However, because the S-CSCF 26 has no data stored in it in relating to the IMPI$_1$/IMPU$_1$ combination, it will assume that this is a new registration request. Therefore, at step 406 the S-CSCF sends a SAR including the Contact1 information to the HSS 28. At step 407, the HSS 28, receiving the SAR with the Contact1 information from the S-CSCF 26 simply, as before, overwrites any existing information it has and at steps 408 through to 411 the "successful" registration of contact1 is indicated by the signals fed back to the S-CSCF 26 and to the UE 20. This means that, as step 407, the previously backed-up information regarding the Contact2 registration has been lost.

FIG. 5 illustrates another problem that can arise with the current procedures in the event of a failure or re-start of the S-CSCF 26. As in FIG. 4, at step 500 a failure (crash) has occurred to the S-CSCF$_1$ 26 such that all the user information has been cleared. The failure has been restored, either by re-starting S-CSCF$_1$ 26 or by the I-CSCF 24 assigning another S-CSCF. However, the S-CSCF has no data relating to registration of the Contact1 or Contact 2 addresses. In this instance, at step 501, the UE initiates a de-registration of the Contact1 address.

At step 502 the de-registration request is forwarded from the P-CSCF 22 to the I-CSCF 24 and steps 503 to 505 proceed as described above in steps 403-405 of FIG. 4. Again, as above, the S-CSCF 26 on receiving the de-registration request has no data stored in its memory in relation to the user. According to current procedures, the S-CSCF simply forwards a SAR message to the HSS, but this will indicate that the S-CSCF information is empty, or simply including no S-CSCF information. Thus, at step 507, the HSS overwrites its backed-up data in relation to the registration of contact addresses for the UE 20 resulting in this data being cleared. As a consequence, the user of UE 20 is now de-registered from the IMS, although all it wished to do was to de-register the Contact1 address. As before, at steps 508 to 511 the "successful" de-registration is communicated back to the UE 20.

The present invention has been conceived with the foregoing in mind.

SUMMARY

The present invention seeks to provide a solution to the problems of losing restoration information in the situations described above. This is achieved through modification to the way in which the HSS and/or the S-CSCF handle requests for re-registration or de-registration of a contact address.

According to a first aspect of the present invention there is provided an IP Multimedia Subsystem, IMS, network node configured as a Home Subscriber Server, HSS. The network node is configured to receive a request for registration of a contact address of a user from a S-CSCF, node serving the user, and to detect if it already has backed-up registered contact address information relating to that user. Alternatively, the HSS can receive a request from the S-CSCF to be provided with backed-up registered contact address information relating to the user. The HSS is configured to notify the S-CSCF of the backed-up registered contact address information.

In a preferred embodiment, the IMS network node is configured to receive a further request from the S-CSCF, the further request including a request for re-registration of the contact address, and in response thereto to update the backed-up registered contact address information.

It is an advantage that, in this way, the HSS updates the complete contact address information in the event of a re-start following a S-CSCF failure, rather than just overwriting the previous data with the registration of a single contact address.

Preferably, the contact address comprises a IMS Private User Identity (IMPI) and IMS Public User Identity (IMPU) of the user. More preferably, the backed-up registered contact address information relating to the user comprises the contact addresses having the same IMPI/IMPU combination.

According to a second aspect of the present invention there is provided an IP Multimedia Subsystem, IMS, network node configured as a Serving-Call Session Control Function, S-CSCF, to receive a request for re-registration of a contact address of a user. Unless the S-CSCF has information related to the contact address, it is configured to forward a request for registration of the contact address to the user's HSS, and to receive in response thereto an error indication together with backed-up information stored by the HSS. The backed-up information includes registered contact address information for the user, and the S-CSCF forwards to the HSS updated information including a request for re-registration of the contact address.

According to a third aspect of the present invention there is provided an IMS network node configured as a S-CSCF, to receive a request for de-registration of a registered contact address for a user. The S-CSCF is configured to check if it has information relating to the registered contact address, and if not to forward a request to a Home Subscriber Server, HSS, to be provided with the user's registered contact address information.

In embodiments of the invention, the IMS network node is further configured, to receive the user's registered contact address information from the HSS and to forward updated information including updated contact address registration information to the HSS.

According to another aspect of the present invention there is provided a method of re-registering a contact address of a user of an IP Multimedia Subsystem, IMS, network. The method includes receiving at a S-CSCF, node serving the user a request for re-registration of the contact address; determining that the S-CSCF has no stored information relating to the contact address; sending a request to a Home Subscriber Server, HSS, of the user to back-up the contact address information; detecting that the contact address information relating to the user has already been backed-up by the HSS; and notifying the S-CSCF, node serving the user of registered contact address information backed-up by the HSS.

The method may further include: sending a further request from the S-CSCF to the HSS, the further request including a request for re-registration of said contact address; and updating the backed-up registered contact address information.

According to yet another aspect of the present invention there is provided a method of de-registering a registered contact address of a user of an IP Multimedia Subsystem, IMS, network. The method includes: receiving a request for de-registration of the contact address at a Serving-Call Session Control Function, S-CSCF, node serving the user; checking if the S-CSCF has information relating to the registered contact address, and if not forwarding a request to a Home Subscriber Server, HSS, to be provided with the user's registered contact address information; receiving at the S-CSCF the user's registered contact address information; and forwarding updated information including updated contact address registration information to the HSS, whereby the registered contact address is de-registered.

It is an advantage that the problems of de-registration of a user as described above, are avoided by the method of this aspect of the invention.

DETAILED DESCRIPTION

Figure 1:
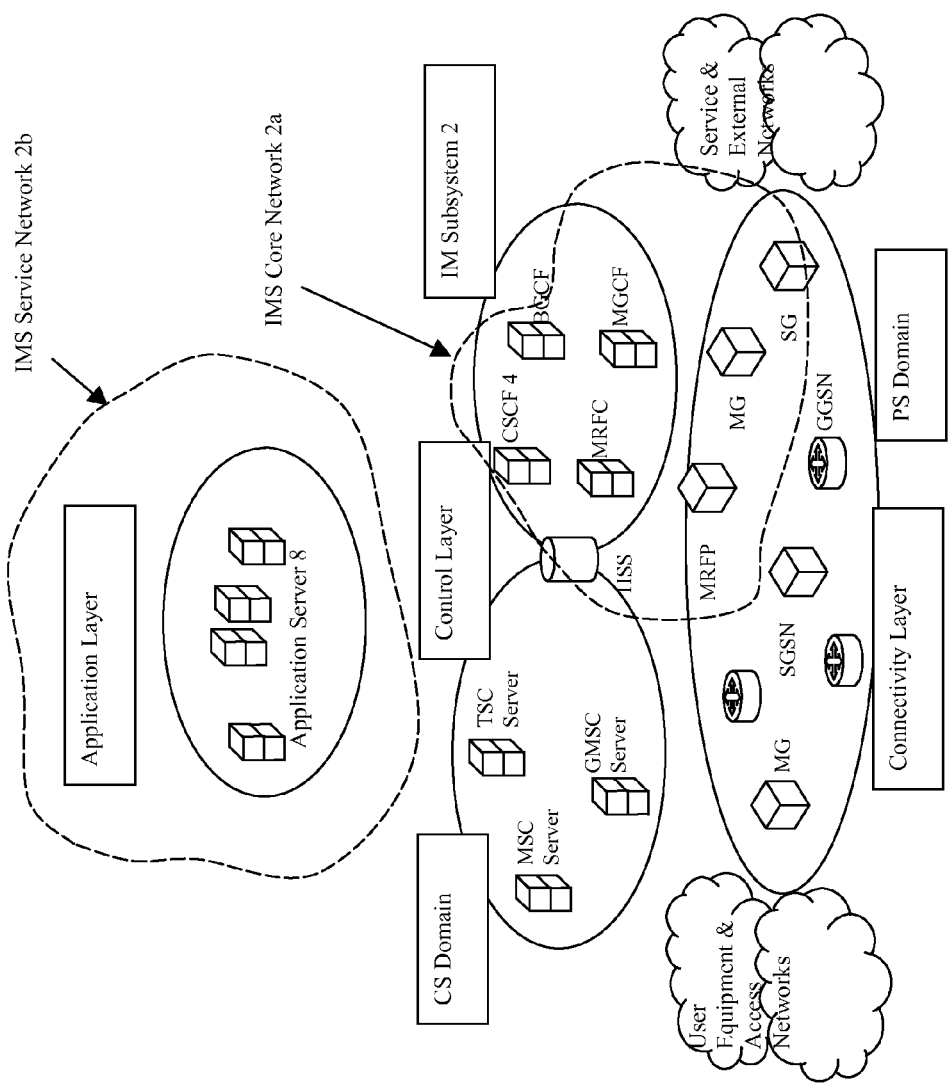
FIG. 1 is a schematic illustration showing how the IMS fits into the mobile network architecture in the case of a GPRS/PS access network.
Figure 2:
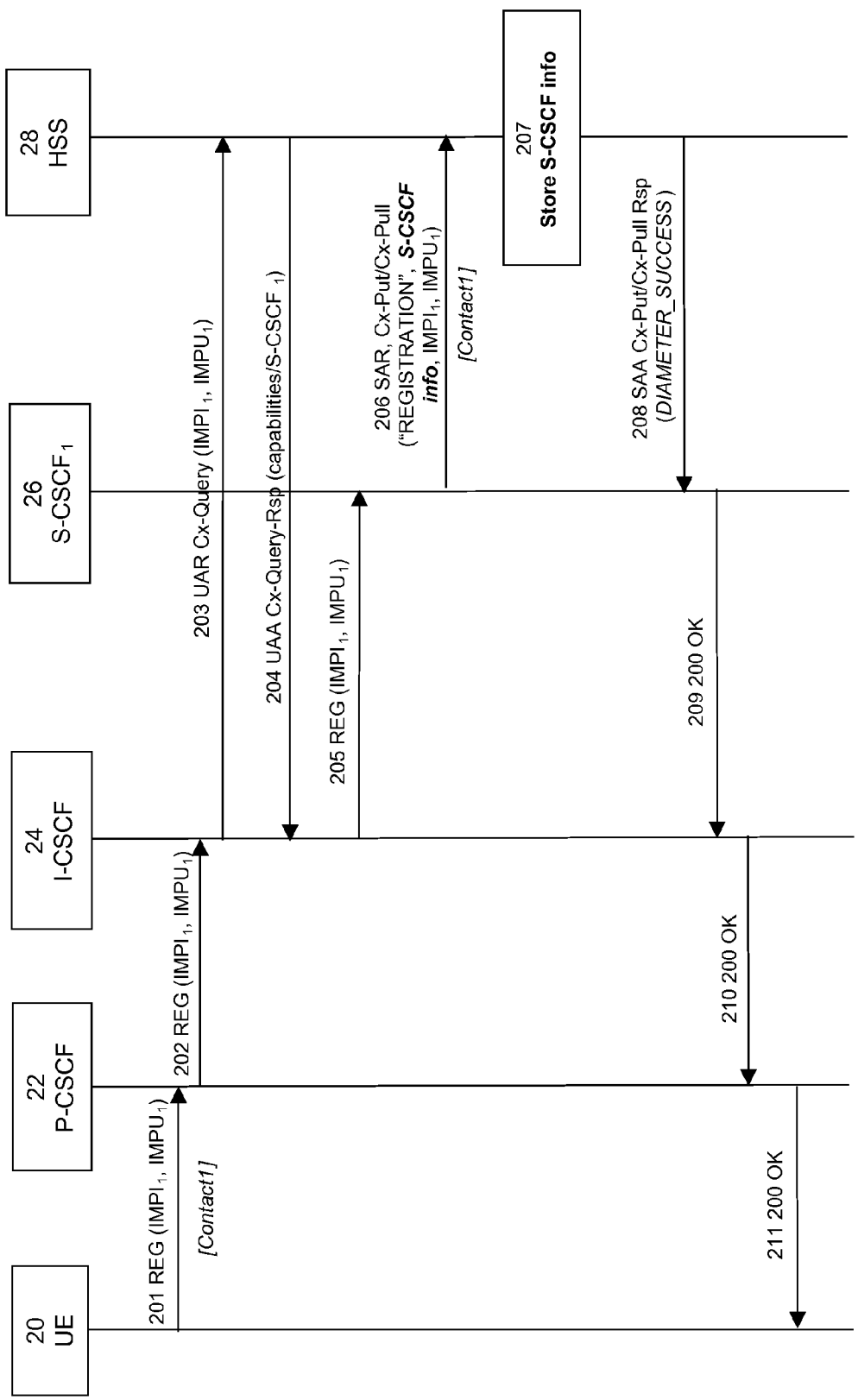
FIG. 2 is a signal flow diagram between network entities in which a UE successfully registers an initial contact address.
Figure 3:
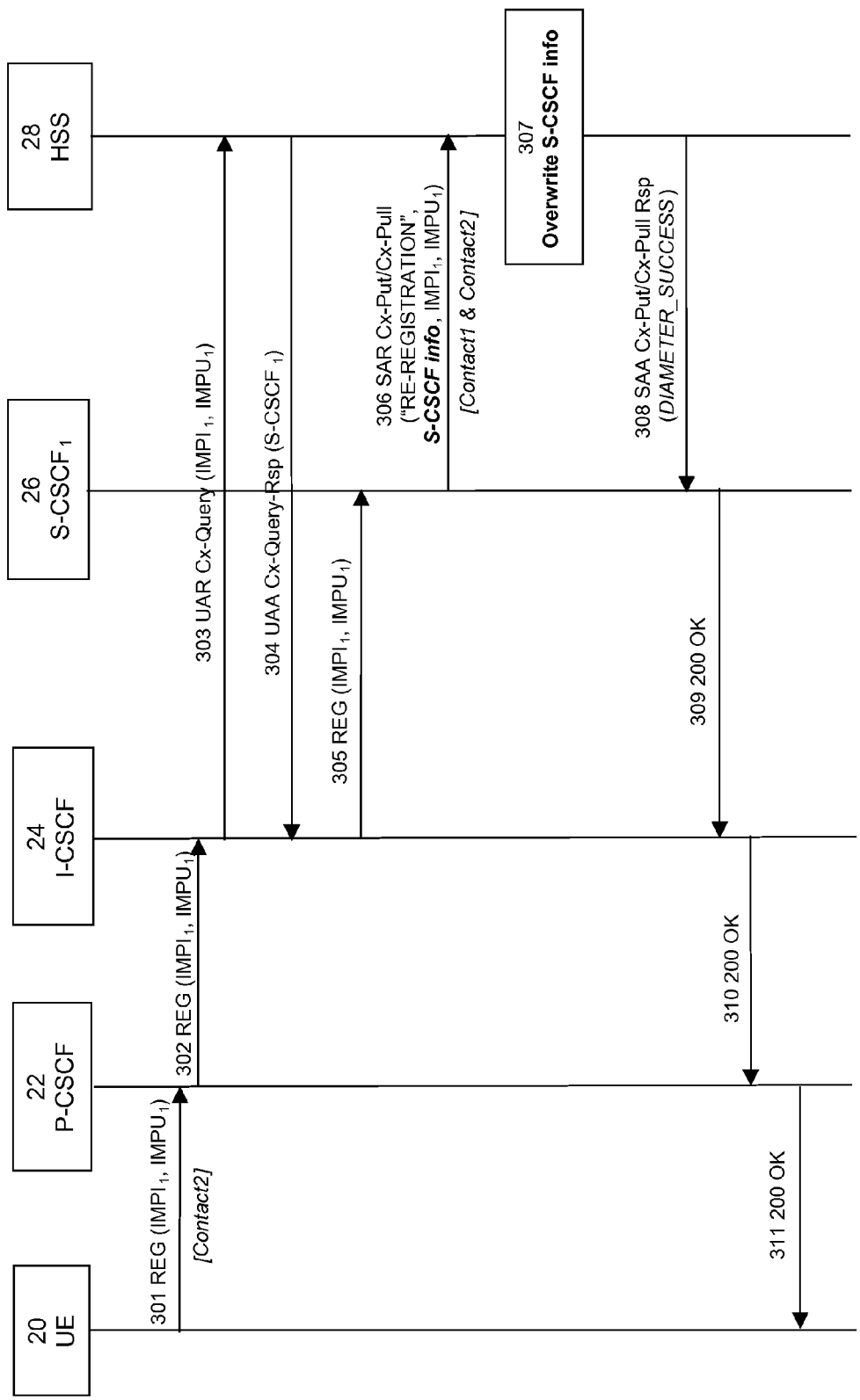
FIG. 3 is a signal flow diagram between the network entities for the UE of FIG. 2 successfully registering a second contact address.
Figure 4:
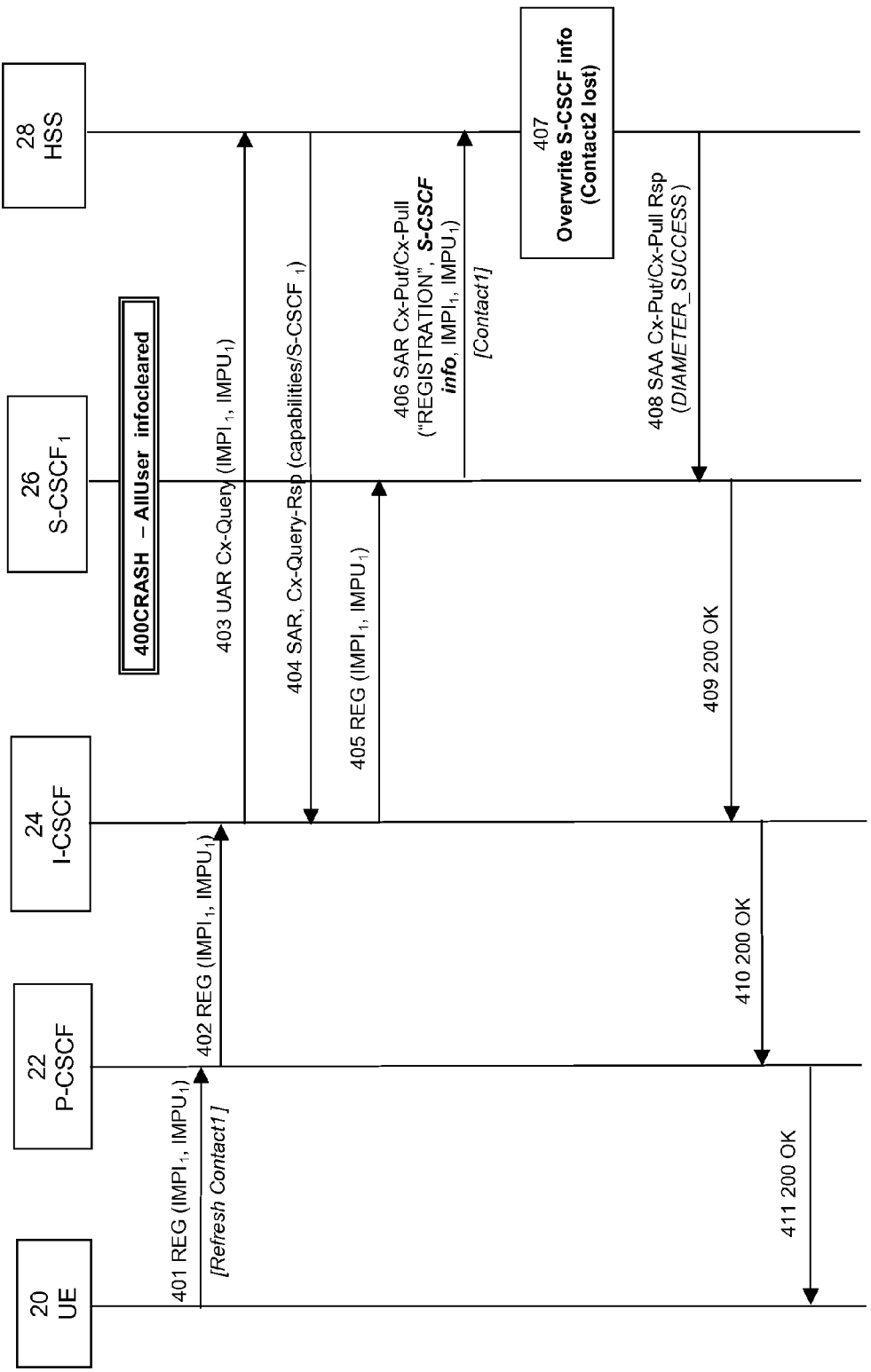
FIGS. 4 and 5 are signal flow diagrams between the network entities of FIG. 2, illustrating problems that can arise with the current procedures.
Figure 6:
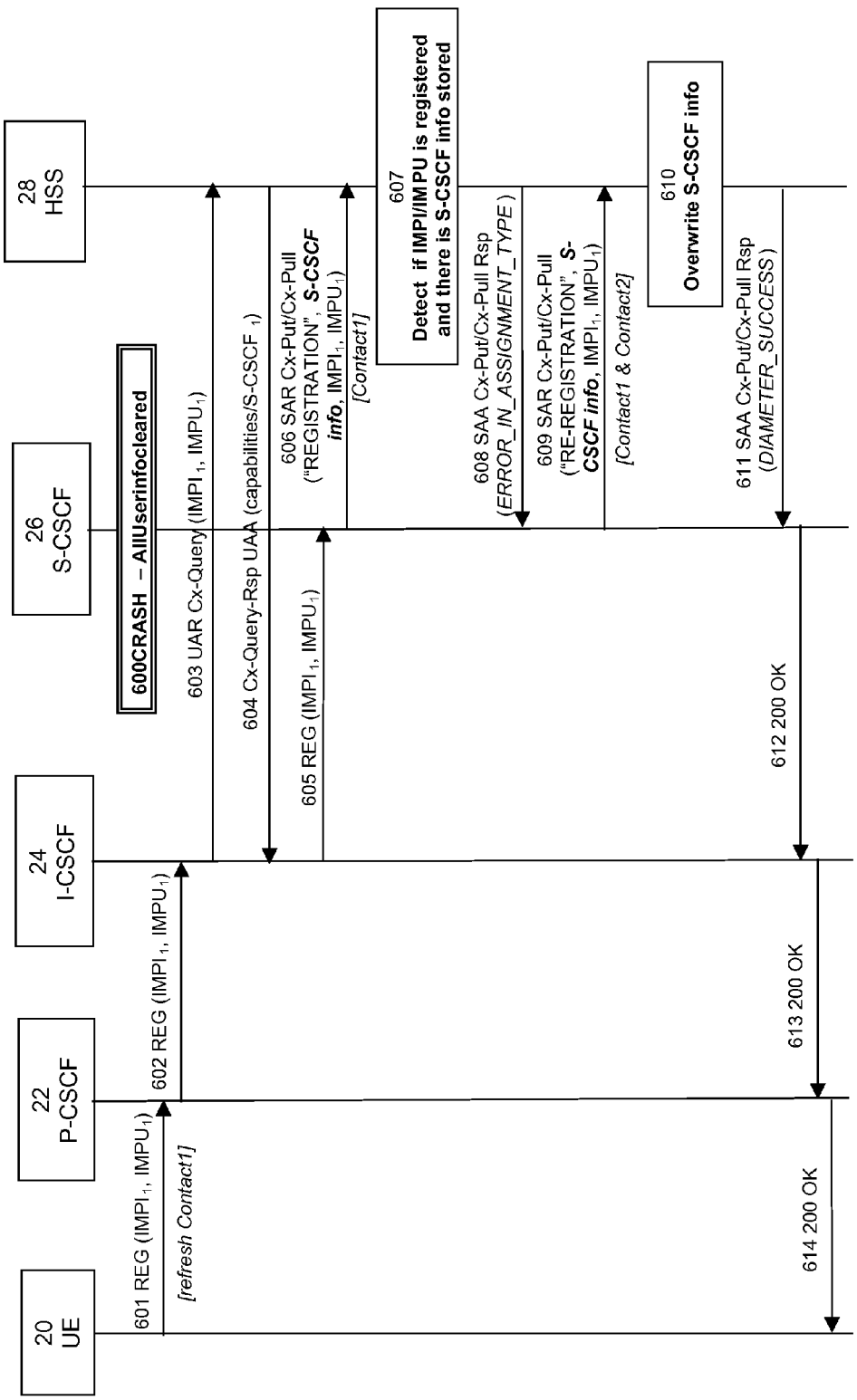
FIGS. 6 and 7 are signal flow diagrams between the network entities of FIG. 2 illustrating embodiments of the invention.

FIG. 6 illustrates how an embodiment of the invention overcomes the problem described above, where the UE 20 attempts to re-register or refresh the contact1 address registration after an S-CSCF 26 has failed, and subsequently been re-started, with all other information having being cleared (step 600). The procedure described above in FIG. 4 in steps 401 to 406 is following in the same way in steps 601 to 606. At this point, the HSS 28, on receiving the SAR from the S-CSCF 26 is configured to first carry out a check to see if the IMPI/IMPU combination is stored as registered and if it already has the contact address information for the IMPI/IMPU combination being used for the Contact1 address registration. If it does, then it will not simply overwrite the backed-up information with the new information provided by the S-CSCF 26, but instead will return a SAA message indicating an error. This message will also provide the backed-up restoration information for the IMPI/IMPU to the S-CSCF 26, which includes the Contact2 information. Thus, at step 609, the S-CSCF can combine the restoration information together with the new request to refresh the Contact1 address registration and send this in a revised SAR to the HSS 28. Now, at step 610, the HSS 28 can proceed as before to overwrite the S-CSCF information in its back-up data memory, but this time the data includes the Contact2 information. Finally at steps 611 to 614 the successful re-registration of the Contact1 information is confirmed back to the UE 20.

Figure 5:
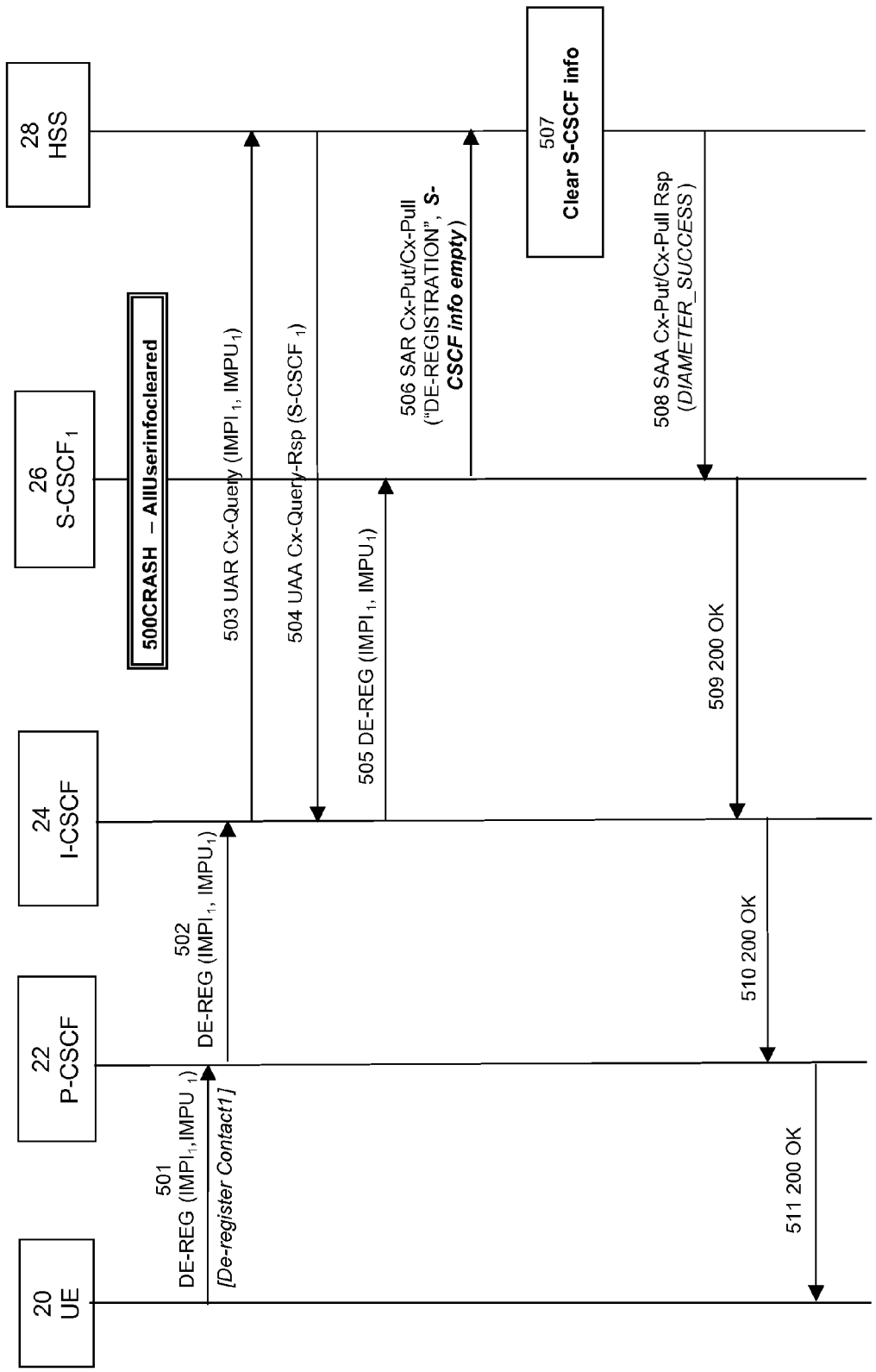
Figure 7:
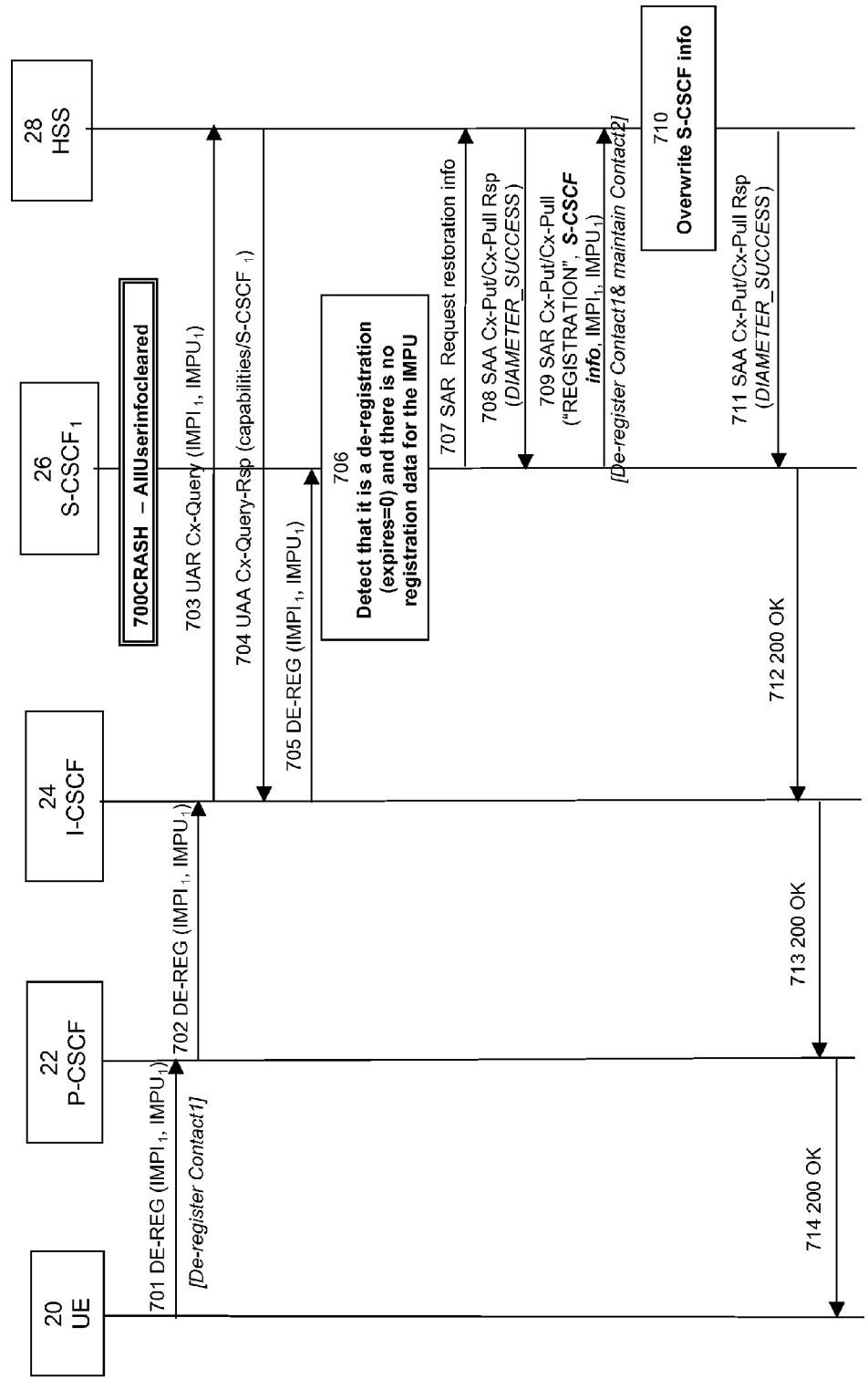

FIG. 7 illustrates how an embodiment of the present invention overcomes the problem described above in FIG. 5 where the UE 20 decides to de-register contact address registration after the S-CSCF 26 has failed and been re-started with all user information held by the S-CSCF 26 having been cleared (step 700). At steps 701 to 705 the process proceeds as described above in FIG. 5, steps 501 to 505. However, on receiving the de-registration request the S-CSCF 26 is configured to detect, at step 706, that the request is for de-registration (identified by an expiry parameter in the registration message being set to zero) and to check that there is no registration data for the IMPU being de-registered. In that case, at step 707, the S-CSCF 26 sends a request to the HSS to be provided with the restoration information that it has backed-up for the IMPI/IMPU combination. The HSS 28 provides this at step 708 in the form of a SAA (DIAMETER_SUCCESS) message. Thereafter, the S-CSCF 26, now having been provided with the restoration information, at step 709 generates and sends a new SAR with updated S-CSCF information, including the correct de-registration of Contact1, but in this case maintaining the Contact2 registration. At step 710, as before, the HSS 28 overwrites the S-CSCF information, but this time it includes the Contact2 address registration information, so that the user does not become de-registered from the IMS. Finally, at steps 711-714, the successful update of the registration information is confirmed back to the S-CSCF 26 and to the UE 20.

The above described embodiments include certain changes to the rules that the HSS and the S-CSCF must follow. The SAR includes a Server-Assignment-Type. When this indicates REGISTRATION, if the Public User Identity (IMPU) of the user is stored as registered in the HSS 28, and if there is restoration information related to the Private User Identity (IMPI), the HSS 28 will not overwrite the restoration information, but will instead send an SAA to the S-CSCF 26, including the restoration information together with the user profile SAA. An exemplary result code would be set to DIAMETER_ERROR_IN_ASSIGNMENT_TYPE.

If the requesting S-CSCF 26 sending the SAR is not the same as the assigned S-CSCF to which the backed-up restoration data for the IMPI/IMPU combination relates, and if there was a previous UAR request for REGISTRATION_AND_CAPABILITIES, from the requesting S-CSCF, then the HSS will overwrite the S-CSCF name. Also, if the Server-Assignment-Type in the SAR indicates NO_ASSIGNMENT, and the requesting S-CSCF is not the same as the assigned S-CSCF, and if there was a previous UAR request for REG- ISTRATION_AND_CAPABILITIES, then the HSS shall overwrite the S-CSCF name. The Result-Code shall be set to DIAMETER SUCCESS. These rules allows for maintenance of a contact address registration when there is a change of S-CSCF (but where there has been no failure resulting in loss of data at the S-CSCF).

If the HSS returns a SAA in response to a SAR having a Server-Assignment-Type indicating REGISTRATION with result code set to DIAMETER_ERROR_IN_ASSIGNMENT_TYPE, and if this includes restoration information, the S-CSCF shall send a new SAR with Server-Assignment-Type set to RE_REGISTRATION to update the restoration information in the HSS accordingly.

If a REGISTER request is received at the S-CSCF with an "expires" header, or an "expires" parameter in the Contact header is set to the value of zero, and for which the public user identity (IMPU) received in the "To" header of the request does not match any IMPU registered at this S-CSCF, the S-CSCF shall:

1) send an SAR to the HSS with Server-Assignment-Type set to NO_ASSIGNMENT to restore the registration data;
2) compare the contact(s) information received in the SAA returned by the HSS with the contact(s) in the REGISTER request, and if they are the same, or if the contact header includes a "*" wildcard character, the S-CSCF will send another SAR to the HSS with Server-Assignment-Type set to USER_DEREGISTRATION;

if they are not the same, the S-CSCF will send another SAR to the HSS with Server-Assignment-Type set to RE_REGISTRATION to update the restoration information in the HSS accordingly.

Figure 8:
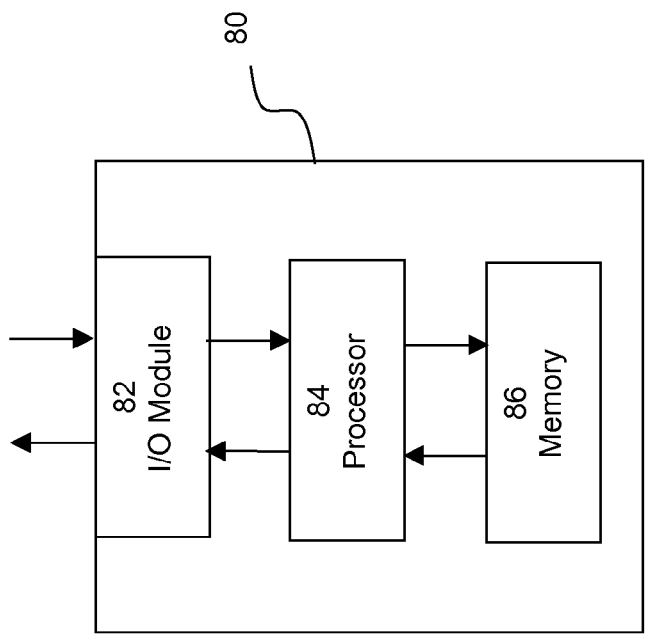
FIG. 8 is a schematic illustration of an IMS network node configured as a HSS.

FIG. 8 illustrates schematically an IMS network node 80 configured as a HSS. The node includes an input/output module 82 whereby signals are sent and received to/from other network entities. These signals include, among others, requests for registration or re-registration of a contact address of a user. The network node 80 also includes a processor 84 and a memory 86, in which registered contact address information is backed-up. In accordance with the invention, the processor 84 is configured, on receiving a request for registration or re-registration of a contact address of a user, to detect if it already has backed-up registered contact address information relating to that user in the memory 86. If it has, the processor 84 is configured to generate and send the backed-up registered contact address information to a S-CSCF node (not shown) serving the user via the input/output module 82. On receiving a further request from the S-CSCF, for registration of the contact address, the processor 84 is configured to update the backed-up registered contact address information in the memory 86.

Figure 9:
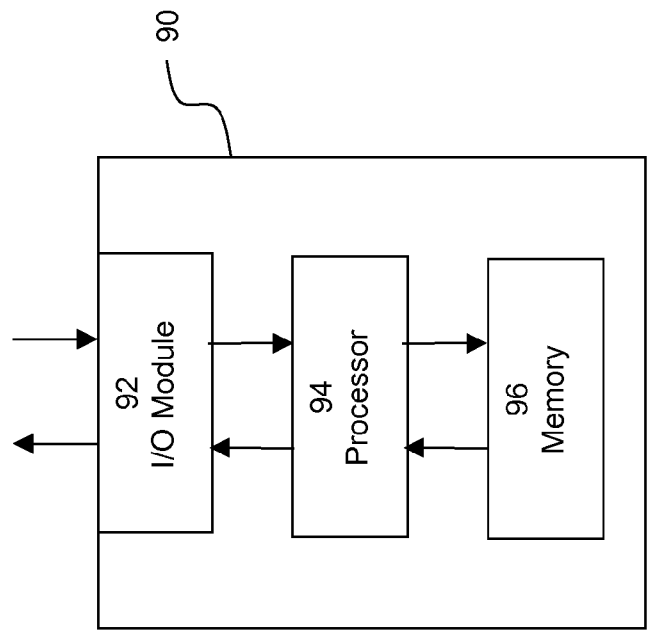
FIG. 9 is a schematic illustration of an IMS network node configured as a S-CSCF.

FIG. 9 illustrates schematically an IMS network node 90 configured as a S-CSCF. The node includes an input/output module 92 whereby signals are sent and received to/from other network entities. These signals include, among others, requests for registration or re-registration or de-registration of a contact address of a user. The network node 90 also includes a processor 94 and a memory 96 for storing data. The network node 90 is configured on receiving a request for registration of a contact address of a user, to send a signal containing information concerning the registration request to a Home Subscriber Server, HSS (not shown). The network node 90 is also configured, on receiving a response from the HSS that includes an error indication together with backed-up information stored by the HSS that includes registered contact address information for the user, to generate and send updated information, including updated contact address registration information to the HSS.

The processor 94 is further configured, on receiving a request for de-registration of a registered contact address for a user, to check if it has information relating to the registered contact address stored in the memory 96. If not, the processor 94 generates and sends, via the input/output module 92, a request to the HSS to be provided with the user's registered contact address information. On receiving the user's registered contact address information from the HSS, the processor 94 generates and sends updated information including updated contact address registration information to the HSS.

Figure 10:
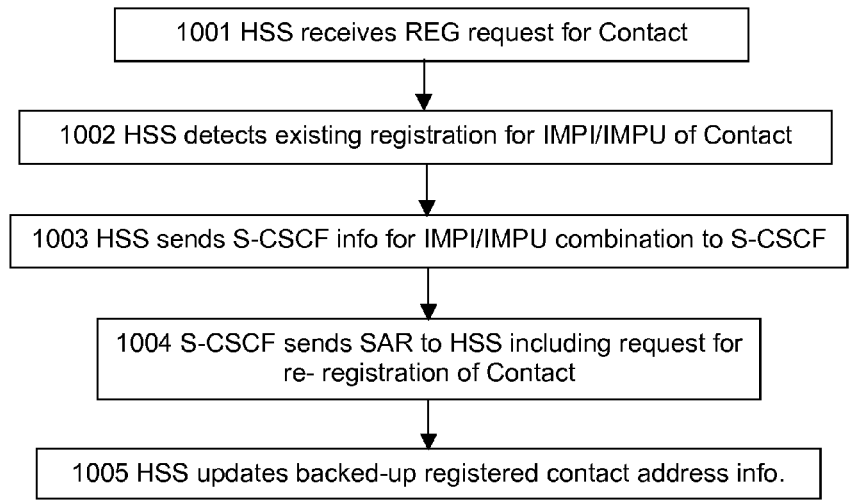
FIG. 10 is a flow diagram illustrating a method according to the invention of re-registering a contact address of an IMS user.

FIG. 10 is a flow diagram illustrating a method of re-registering a contact address of an IMS user. At step 1001 the user's HSS receives a request for registration of the contact address. At step 1002 the HSS detects whether or not it has any contact address information relating to the user (IMPI/IMPU combination) already backed-up. At step 1003, the HSS sends a notification to the S-CSCF node serving the user, which includes all of the backed-up registered contact address information.

At step 1004 a further request is sent from the S-CSCF to the HSS, which includes a request for registration of the contact address (as well as any information relating to other contact addresses that were contained in the notification it received at step 1003). At step 1005 the HSS updates the backed-up registered contact address information.

Figure 11:
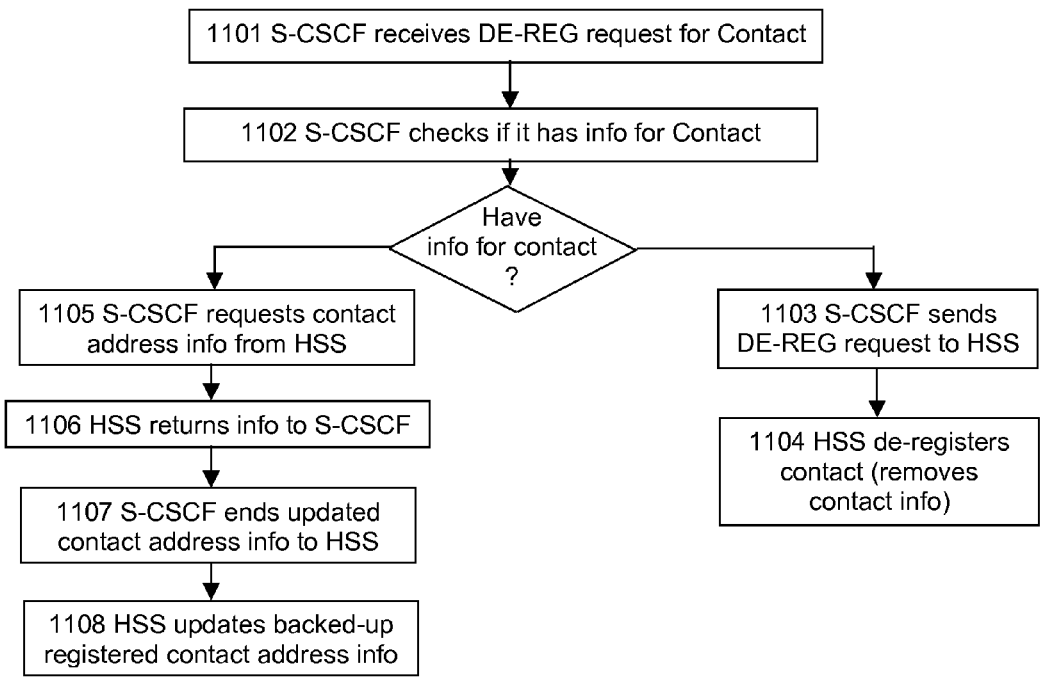
FIG. 11 is a flow diagram illustrating a method according to the invention of de-registering a registered contact address of an IMS user.

FIG. 11 is a flow diagram illustrating a method of de-registering a registered contact address of an IMS user. At step 1101 a request for de-registration of the contact address is received at a S-CSCF node serving the user. At step 1102 the S-CSCF checks to see if it has information relating to the registered contact address. If it does, then at step 1103 it simply forwards the de-registration request to the user's HSS, and at step 1104 the HSS removes the contact address information, thereby completing the de-registration. If at step 1102 the S-CSCF found that it did not have any information relating to the registered contact address, then at step 1105 it forwards a request to the HSS, to be provided with the user's registered contact address information. At step 1106 the user's registered contact address information is returned from the HSS to the S-CSCF. Finally, at step 1107 the S-CSCF forwards updated information including updated contact address registration information to the HSS. At step 1108 the HSS updates the registration information, which includes removing the contact address to complete the de-registration.

The invention claimed is:

1. An IP Multimedia Subsystem (IMS) network node configured as a Home Subscriber Server (HSS), said IMS network node comprising:

at least one processor and at least one memory, wherein the memory contains instructions that, when executed by the processor, cause the node to perform the functions of:

receiving a request for registration of a contact address of a user from a Serving-Call Session Control Function (S-CSCF) node serving the user;

detecting if the HSS already has backed-up registered contact address information relating to that user;

returning an error-indication message to the S-CSCF together with the backed-up registered contact address information; and, receiving a further request from the S-CSCF, the further request including a request for re-registration of said contact address and, in response thereto, to update the backed-up registered contact address information.

2. The IMS network node of claim 1, wherein said contact address comprises an IMS Private User Identity (IMPI) and an IMS Public User Identity (IMPU) of the user.

3. The IMS network node of claim 2, wherein the backed-up registered contact address information relating to the user comprises the contact addresses having the same IMPI/IMPU combination.

4. An IP Multimedia Subsystem (IMS) network node configured as a Serving-Call Session Control Function (S-CSCF), said IMS network node comprising:
- at least one processor and at least one memory, wherein the memory contains instructions that, when executed by the processor, cause the node to perform the functions of:
- receiving a request for re-registration of a contact address of a user;
- forwarding, unless the S-CSCF has information related to the contact address a request for registration of said contact address to the user's Home Subscriber Server (HSS);
- receiving, in response thereto, an error indication together with backed-up information stored by the HSS including registered contact address information for the user; and,
- forwarding to the HSS updated information including a request for re-registration of said contact address registration information.

5. An IP Multimedia Subsystem (IMS) network node configured as a Serving-Call Session Control Function (S-CSCF), said IMS network node comprising:
- at least one processor and at least one memory, wherein the memory contains instructions that, when executed by the processor, cause the node to perform the functions of:
- receiving a request for de-registration of a registered contact address for a user;
- in response to said request for de-registration, checking if the S-CSCF has information relating to the registered contact address and, if not, to forward a request to a Home Subscriber Server (HSS) to be provided with the user's backed-up registered contact address information; and,
- receiving the user's backed-up registered contact address information from the HSS and to forward updated information including updated contact address registration information to the HSS.

6. The IMS network node of claim 4, wherein said contact address comprises an IMS Private User Identity (IMPI) and an IMS Public User Identity (IMPU) of the user.

7. The IMS network node of claim 6, wherein the information related to the contact address comprises information of registered addresses for the same IMPU.

8. A method of re-registering a contact address of a user of an IP Multimedia Subsystem (IMS) network, the method comprising the steps of:
- receiving, at a Serving-Call Session Control Function (S-CSCF) node serving the user, a request for re-registration of the contact address;
- in response to said request for re-registration:
  - determining that the S-CSCF has no stored information relating to the contact address;
  - sending a request to a Home Subscriber Server (HSS) of the user to back-up the contact address information;
  - detecting that the contact address information relating to the user has already been backed-up by the HSS; and,
  - notifying the S-CSCF node serving the user of registered contact address information backed-up by the HSS;
  - sending a further request from the S-CSCF to the HSS, the further request including a request for re-registration of said contact address; and,
  - updating the backed-up registered contact address information.

9. A method of de-registering a registered contact address of a user of an IP Multimedia Subsystem (IMS) network, the method comprising the steps of:
- receiving a request for de-registration of the contact address at a Serving-Call Session Control Function (S-CSCF) node serving the user;
- checking if the S-CSCF has information relating to the registered contact address and, if not, forwarding a request to a Home Subscriber Server (HSS) to be provided with the user's backed-up registered contact address information;
- receiving at the S-CSCF the user's backed-up registered contact address information; and,
- forwarding updated information including updated contact address registration information to the HSS, whereby the registered contact address is de-registered.

\* \* \* \* \*

UNITED STATES PATENT AND TRADEMARK OFFICE
CERTIFICATE OF CORRECTION

| | | |
|---|---|---|
| PATENT NO. | : 9,026,675 B2 | Page 1 of 1 |
| APPLICATION NO. | : 13/127171 | |
| DATED | : May 5, 2015 | |
| INVENTOR(S) | : Merino Vazquez et al. | |

It is certified that error appears in the above-identified patent and that said Letters Patent is hereby corrected as shown below:

On the Title Page, in Item (75), under "Inventors", in Column 1, Line 2, delete "Hagersten" and insert -- Hägersten --, therefor.

In the Claims

In Column 9, Line 17, in Claim 4, delete "address" and insert -- address, --, therefor.

Signed and Sealed this
Thirteenth Day of October, 2015

Michelle K. Lee
*Director of the United States Patent and Trademark Office*